US005113106A

United States Patent [19]

Schmid

[11] Patent Number: 5,113,106

[45] Date of Patent: May 12, 1992

[54] BRUSH HOLDER FOR AN ELECTRICAL COMMUTATING MACHINE

[75] Inventor: Hans-Dieter Schmid, Oberriexingen, Fed. Rep. of Germany

[73] Assignee: Robert Bosch GmbH, Stuttgart, Fed. Rep. of Germany

[21] Appl. No.: 603,768

[22] PCT Filed: Jun. 1, 1989

[86] PCT No.: PCT/DE89/00352

§ 371 Date: Oct. 26, 1990

§ 102(e) Date: Oct. 26, 1990

[87] PCT Pub. No.: WO89/12924

PCT Pub. Date: Dec. 28, 1989

[30] Foreign Application Priority Data

Jun. 18, 1988 [DE] Fed. Rep. of Germany ... 8807881[U]

[51] Int. Cl.5 ............ H02K 13/00

[52] U.S. Cl. ............ 310/239; 310/328; 310/42; 310/45; 310/91

[58] Field of Search ............ 310/238, 239, 241, 242, 310/244, 245, 247, 45, 42, 43, 91

[56] References Cited

U.S. PATENT DOCUMENTS

| | | | |
|---|---|---|---|
| 1,490,104 | 4/1924 | Gilchrist | 310/239 |
| 1,954,910 | 4/1934 | Allen | 310/239 |
| 2,683,826 | 7/1954 | Staak | 310/239 |
| 3,527,971 | 9/1970 | Means | 310/239 |
| 3,654,504 | 4/1972 | Susdorf | 310/239 |
| 3,731,126 | 5/1973 | Hagenlocher | 310/239 |

FOREIGN PATENT DOCUMENTS

| | | |
|---|---|---|
| 2431206 | 2/1980 | France . |
| 1080993 | 8/1967 | United Kingdom . |

*Primary Examiner*—R. Skudy

*Attorney, Agent, or Firm*—Michael J. Striker

[57] ABSTRACT

A brush holder for an electrical commutating machine has a brush plate and at least two brush mounts fastened on the brush plate and adapted to accommodate a carbon brushes. Each of the brush mounts has a pull-through pin coaxial with one of brush plate openings and a supporting web fastened to the brush plate. A fastening element extending through another brush plate opening and through the web opening. An insulating plate is located between the brush plate and the brush mount so that the pull-through pin projects into one insulating plate opening. An insulating part is located at a side of the brush plate and fastened by the fastening element which passes through one insulating part opening coaxial with the other brush plate opening. The insulating part has annular webs which surround the insulating part openings and project axially toward the brush plate. One of said annular webs projects through the another brush plate opening while the other of the annular webs engages through the one brush plate opening and through the one insulating plate opening in a form-fitting manner. The pull-through pin engages in the other annular web in a form-fitting fashion.

6 Claims, 1 Drawing Sheet

BRUSH HOLDER FOR AN ELECTRICAL COMMUTATING MACHINE

BACKGROUND OF THE INVENTION

The invention relates to a brush holder for an electrical commutating machine, in particular for a d.c. machine for vehicles. More particularly the present invention relates to such a brush holder which has a brush plate supported in the frame of the commutating machine, and at least two brush mounts fastened in an insulating fashion on the brush plate and each accommodating a carbon brush and provided on their bearing side with a pull-through pin and a supporting web.

Apart from the insulating plate arranged between the brush mount with supporting web and brush plate, in a known brush holder of the above-mentioned type in order to ensure the insulated fastening of the brush mount on the brush plate, a first insulating disc is arranged between the brush plate and the rivet head overreaching the brush plate, and a second insulating plate is inserted between the rivet shaft and the bore, substantially larger in comparison thereto, in the brush plate. The entire brush mount is supported by the single rivet bolt.

In the case of extreme stresses on the commutating machine owing to impacts, shaking or severe temperature fluctuations, such as normally occur in vehicle operation, it has been found in connection with such brush holders that the brush mounts rotate on the brush plate and assume angular positions with respect to the commutator which are detrimental to proper commutating.

Consequently, in the case of a brush holder that is likewise known (U.S. Pat. No. 1,490,104) two supporting webs have been provided on the brush mount, and each supporting web has been riveted to the brush plate with the interposition of suitable insulating discs. Due to the double riveting, the assembly of such a brush holder is more intensive in terms of time. Again, the brush mount needs to be altered in design.

SUMMARY OF THE INVENTION

The brush holder according to the invention has the advantage that the insulating part necessary for the insulated fastening of the brush mount on the brush plate simultaneously provides for the brush mount a reliable guarantee against rotation. This guarantee against rotation is achieved due to the fact that through the annular web on the insulating part, on the one hand, the riveted insulating part itself is fixed in the brush plate and, on the other hand, the pull-through pin of the brush mount is fixed with the insulating plate on the insulating part in a form-fitting fashion. There is no change in the time-saving nature of the assembly, since only one rivet bolt must be riveted per brush mount. The insulating part according to the invention is a simple injection-moulded part or pressed part, which can be produced cost-effectively. Another insulating part is arranged on the brush plate at its side opposite to the brush mount and fixed by the same rivet bolt.

The second annular web is integrally formed in accordance with an advantageous embodiment of the invention on the insulating part around the first circular cutout produces an insulation between the rivet shaft and the edges of the bore in the brush plate. Therefore the special insertion into the bore of an insulating disc becomes superfluous, and a further assembly step is saved. In this process, the annular web can terminate either flush with the brush plate or, after further passing through the insulating plate, flush with the insulating plate.

An enhanced guarantee against axial lifting of the brush mount from the brush plate is achieved through additionally fastening the brush mount to the brush plate by means of a hollow rivet, which passes through the pull-through pin of the brush mount, the annular web and the second cutout of the insulating part. Such an additional guarantee is to be recommended above all in the case of installing the commutating machine in construction vehicles, where rugged operating conditions prevail. Brief description of the drawings The invention is explained in more detail in the following description with reference to illustrative embodiments represented in the drawing.

DESCRIPTION OF PREFERRED EMBODIMENTS

Figure 1:
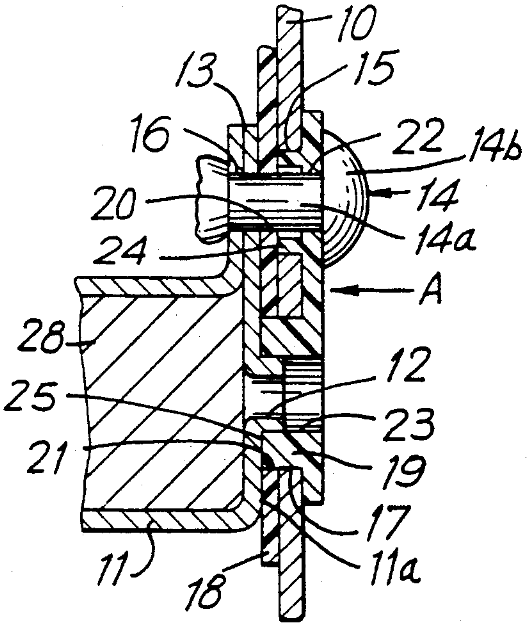
FIG. 1 shows part of a longitudinal section of a brush holder for a commutating machine.

A brush holder, only part of which is represented in longitudinal section in FIG. 1, is used for an electrical commutating machine and preferably in a d.c. machine for vehicles, such as a generator or starter. It has a brush plate 10, which is supported unable to rotate in the frame (not shown) of the commutating machine; Depending upon the design of the commutating machine with brush mounts 11 which are arranged on a circle offset by approximately the same peripheral angle, are fastened on the brush plate 10. In this arrangement, n is a whole number. Each brush mount 11 contains, in a known way, a carbon brush 28, which is supported in the brush mount 11 in an axially displaceable fashion parallel to the brush plate 10, and seated, under the action of a holding spring (not represented here), on the commutator of the commutating machine. An example for the arrangement of the brush mounts on the brush plate with allocation to the commutator of the commutating machine is represented and described in U.S. Pat. No. 1,490,104.

The brush mount is formed of sheet metal. It carries on its bearing side 11*a*, which faces the brush plate 10, a hollow cylindrical pull-through pin 12. It also carries in the prolongation of the bearing side 11*a* a supporting web 13, which stands away at a right angle from the brush mount 11 and serves to fasten the brush mount 11 to the brush plate 10. The fastening of the brush mount 11 is done on the brush plate 10 in an insulated fashion, to be precise by means of a single rivet bolt 14. For this purpose, a bore 15 is provided in the supporting web 13, and a bore 16, is provided in the brush plate 10. The coaxial with the bore 15 and the shaft 14*a* of the rivet bolt 14 projects, through it. A circular through opening 17 is provided in the brush plate 10 coaxially with the pull-through pin 12.

Figure 2:
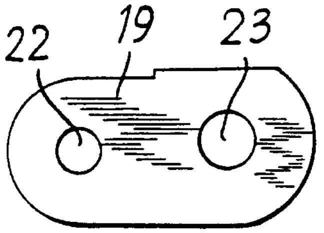
FIG. 2 shows a plan view in the direction of the arrow A of an insulating part of the brush holder in FIG. 1.
Figure 3:
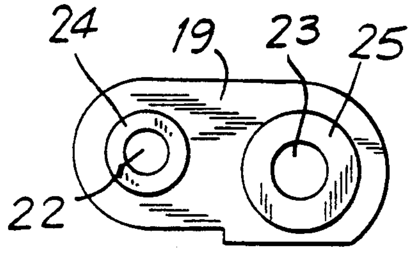
FIG. 3 shows a bottom view of the insulating part in FIG. 2.

For the purpose of fastening the brush mount 11 in an insulated fashion to the brush plate 10, an insulating disc 18 is arranged on one side of the brush plate 10 between the latter and the brush mount 11 with the supporting web 13, and an insulating part 19 is arranged on the other side. The insulating disc 18 carries two circular cutouts 20, 21, which are each arranged coaxially with the bore 15 and the through opening 17 of the brush plate 10, respectively. The insulating part 19 correspondingly carries two circular cutouts 22 and 23, which are likewise arranged coaxially with the bore 15 and through opening 17, respectively, in the brush plate 10. Each cutout 22, 23 is surrounded by an annular web 24 and 25, respectively, each web is of one piece with the insulating part 19 and, on the side of the insulating part 19 which faces the brush plate 10, projects axially as shown in FIGS. 2 and 3. In this arrangement, the axial length of the annular web 24 is chosen such that it projects through the bore 15 in the brush plate 10, and terminates flush with the brush plate 10 on the bearing side thereof for the insulating disc 18. The external diameter of the annular web 24 is smaller in this arrangement than the clearance of the bore 15 in the brush plate 10, while the internal diameter of the annular web 24 is chosen to be somewhat larger than the diameter of the rivet shaft 14*a* of the rivet bolt 14. The axial length of the annular web 25 is dimensioned such that the web passes both through the through opening 17 in the brush plate 10 and through the cutout 21 in the insulating disc 18, and terminates flush with the insulating disc 18 on the side thereof facing the brush mount 11. The radial annular width of the annular web 25 is dimensioned such that the annular web 25 surrounds the pull-through pin 12 of the brush mount 11, which projects into the cutout 21 in the insulating plate 18, on the one hand, and is located in a form-fitting fashion in the through opening 17 of the brush plate 10 and in the congruent cutout 21 of the insulating plate 18, on the other hand.

To assemble the brush holder, the insulating part 19 is firstly placed upon the brush plate 10 in such a way that the annular web 24 projects through the bore 15, on the one hand, and the annular web 25 projects through the through opening 17 in the brush plate 10, on the other hand. The insulating plate 18 is then placed on the opposite side of the brush plate 10, and the cutout 21 of said plate being pushed over the annular web 25, and its cutout 20 being aligned coaxially with the bore 15. Starting from the side of the insulating part 19, the rivet bolt 14 is plugged through the cutout 22, the bore 15 and the cutout 20, so that its rivet head 14*b* bears against the insulating part 19, and the free end of the rivet shaft 14*a* projects from the insulating plate 18. The brush mount 11 is now placed on the insulating plate 18, to be precise in such a way that pull-through pin 12 projects into the interior of the annular web 25 in a form-fitting fashion and the bore 16 in the supporting web 13 embraces the rivet shaft 14*a*. The rivet bolt 14 is subsequently caulked, so that the brush mount 11 is supported permanently on the brush plate 10. The brush mount 11 is fixed and guaranteed not to rotate on the brush plate 10 by means of the pull-through pin 12 on the brush mount 11, which engages in a form-fitting fashion in the annular web 25, and by means of the annular web 25, which projects in a form-fitting fashion both through the through opening 17 in the brush plate 10 and through the opening 21 in the insulating plate 18.

Figure 4:
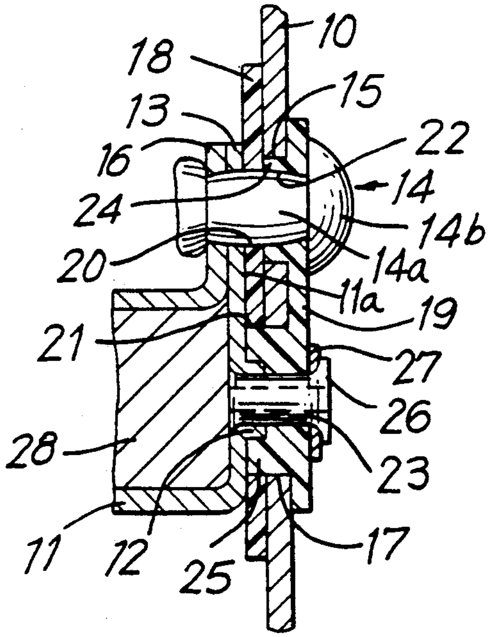
FIG. 4 shows part of a longitudinal section of a brush holder in accordance with a further illustrative embodiment.

In the further illustrative embodiment of a brush holder, shown in part in FIG. 4, for the purpose of additionally securing the brush mount 11 on the brush plate 10, a hollow rivet 26 is led through the pull-through pin 12, the annular web 25 and the through opening 17 in the insulating part 19, and is caulked on a washer 27 seated on the insulating part 19 after the washer has been slipped on. Otherwise, this brush holder corresponds to the brush holder previously described and represented in FIG. 1.

Figure 5:
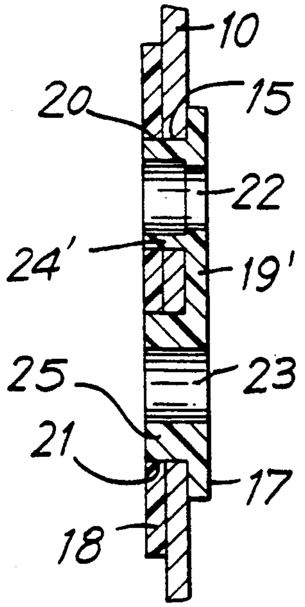
FIG. 5 shows a part of a longitudinal section of the brush plate, insulating disc and insulating part of a brush holder in accordance with the third illustrative embodiment.

In a variant of the insulating part 19' represented in FIG. 5, the annular web 24', which surrounds the cutout 22 and is of one piece with the insulating part 19, has an axial length such that said annular web penetrates not only the bore 15 in the brush plate 10 but also the cutout 20 in the insulating plate 18, and thereof facing the supporting web 13. The internal diameter of the annular web 24' is, in turn, chosen to be somewhat larger than the bore 15, so that the rivet bolt 14 can be led without any problem through the interior of the annular web 24'.

It will be understood that each of the elements described above, or two or more together, may also find a useful application in other types of constructions differing from the types described above.

While the invention has been illustrated and described as embodied in a brush holder for an electrical commutating machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A brush holder for an electrical commutating machine, in particular for a DC machine for vehicles, comprising a brush plate adapted to be supported in a frame of the commutating machine and having first and second brush plate openings spaced from one another; a brush mount fastened in an insulating fashion on said brush plate and adapted to support a carbon brush, said brush mount having a bearing side which faces said brush plate and carrying a pull-through pin coaxial with one of said brush plate openings and a supporting web having a web opening; a fastening element extending through another one of said brush plate openings and through said web opening; an insulating plate located between said brush plate and said brush mount and having two insulating plate openings so that said pull-through pin projects into one of said insulating plate openings; an insulating part located at a side of said brush plate which is opposite to said brush mount and having two insulating part openings and fastened by said fastening element which passes through one of said insulating part openings, said insulating part having annular webs which surround said insulating part openings and project axially toward said brush plate so as to be of one piece with said insulating part, one of said annular webs projecting through said another brush plate opening while a other of said annular webs engages through said one brush plate opening and through said one insulating plate opening in a form-fitting manner, said pull-through pin engaging in said other annular web in a form-fitting fashion.

2. A brush holder as defined in claim 1, wherein said one of said annular webs terminates flush with said brush plate.

3. A brush holder as defined in claim 1, wherein said another of said annular webs terminates flush with said insulating plate.

4. A brush holder as defined in claim 1, wherein said brush mount is additionally mounted to said brush plate; and further comprising means for additionally mounting said brush mount to said brush plate and including a hollow rivet.

5. A brush holder as defined in claim 4, wherein said hollow rivet passes through said pull-through pin of said brush mount and said another of said annular webs.

6. A brush holder as defined in claim 5, wherein said hollow rivet has a flanged edge; and further comprising a washer arranged between said insulating part and said flanged edge of said hollow rivet.

* * * * *